(12) United States Patent
Antonio et al.

(10) Patent No.: US 11,386,331 B2
(45) Date of Patent: Jul. 12, 2022

(54) DETECTING CORRELATION AMONG SETS OF TIME SERIES DATA

(71) Applicant: Accenture Global Solutions Limited, Dublin (IE)

(72) Inventors: Emmanuel Benbinuto Antonio, Mandaluyong (PH); Yvonne Jean Martinez, Negros Oriental (PH); Raye Willson Paez Raymundo, Cavite (PH); Michael D. G. Agito, Quezon (PH); Elpidio J. C. Dalupang, Metro Manila (PH)

(73) Assignee: Accenture Global Solutions Limited, Dublin (IE)

( * ) Notice: Subject to any disclaimer, the term of this patent is extended or adjusted under 35 U.S.C. 154(b) by 1116 days.

(21) Appl. No.: 15/960,005

(22) Filed: Apr. 23, 2018

(65) Prior Publication Data

US 2019/0325319 A1    Oct. 24, 2019

(51) Int. Cl.
*G06F 16/24* (2019.01)
*G06N 3/12* (2006.01)
*G06F 16/2458* (2019.01)
*G06N 3/08* (2006.01)

(52) U.S. Cl.
CPC ......... *G06N 3/126* (2013.01); *G06F 16/2465* (2019.01); *G06N 3/086* (2013.01)

(58) Field of Classification Search
CPC .................................................. G06F 16/2465
See application file for complete search history.

(56) References Cited

U.S. PATENT DOCUMENTS 8,762,302 B1 * 6/2014 Spivack ................. G06Q 50/01
706/12

* cited by examiner

*Primary Examiner* — Baoquoc N To
(74) *Attorney, Agent, or Firm* — Harrity & Harrity, LLP

(57) ABSTRACT

A device may receive time series data from one or more data sources. The device may pre-process the time series data to generate a respective time series chart for multiple classifications included in the time series data. The device may randomly select a pair of respective time series charts and a correlation detection technique after pre-processing the time series data. The device may determine a correlation for the pair of respective time series charts based on using the correlation detection technique. The device may determine a score for the pair of respective time series charts based on the correlation of the pair of respective time series charts. The score may indicate an extent to which the pair of respective time series charts is correlated with each other. The device may perform one or more actions after determining the score for the pair of respective time series charts.

20 Claims, 7 Drawing Sheets

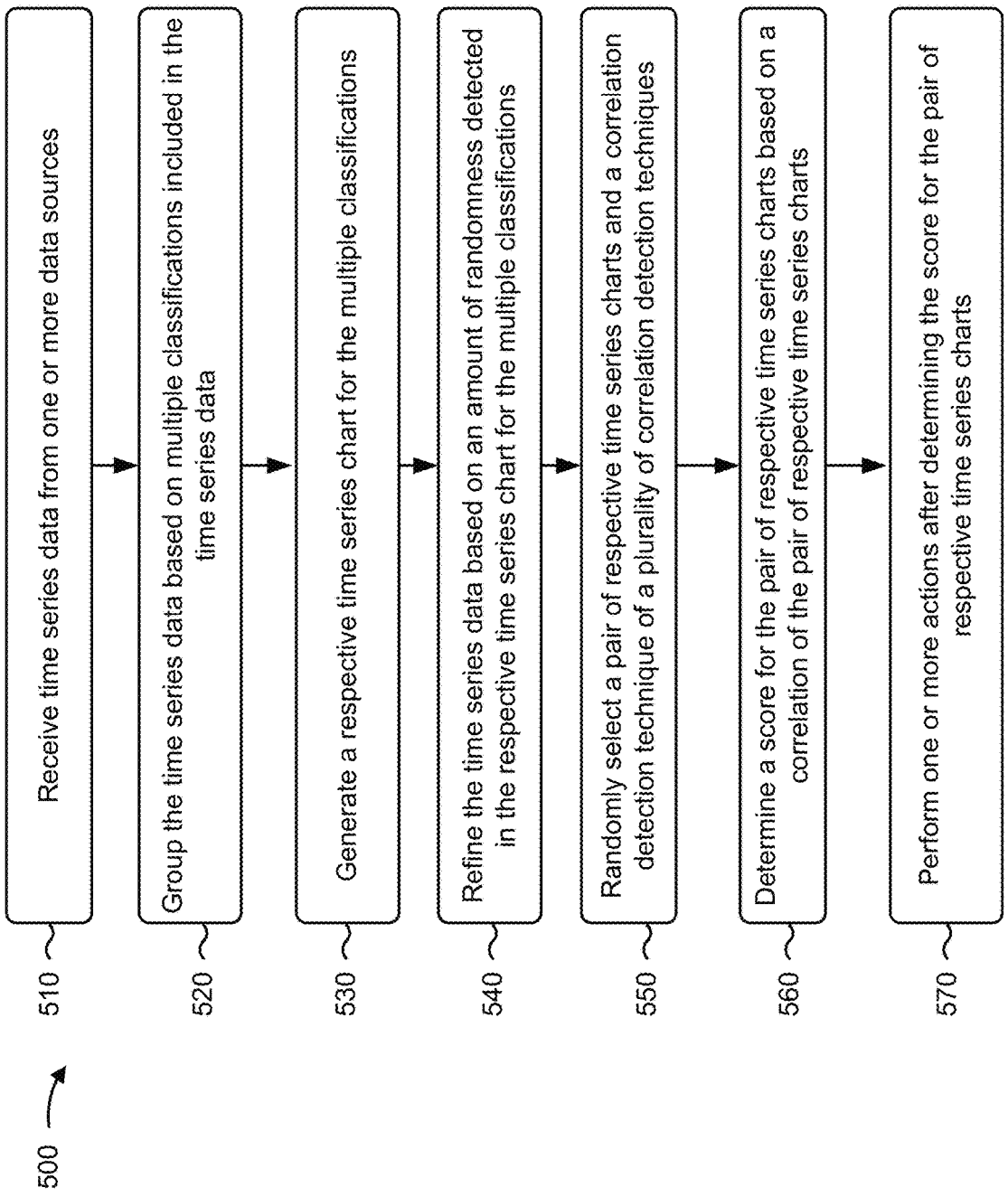

DETECTING CORRELATION AMONG SETS OF TIME SERIES DATA

BACKGROUND

Data analysis may include the process of inspecting, cleansing, transforming, and/or modeling data. For example, the goal of data analysis may include discovering useful information, suggesting conclusions, and/or supporting decision-making. Data mining may include a particular data analysis technique that focuses on modeling and knowledge discovery for predictive rather than descriptive purposes.

SUMMARY

According to some possible implementations, a method may include receiving, by a device, time series data from one or more data sources. The method may include pre-processing, by the device, the time series data to generate a respective time series chart for multiple classifications included in the time series data. The method may include randomly selecting, by the device, a pair of respective time series charts and a correlation detection technique of a plurality of correlation detection techniques. The correlation detection technique may be associated with detecting a correlation of the pair of respective time series charts. The method may include determining, by the device, a score for the pair of respective time series charts based on the correlation of the pair of respective time series charts. The score may indicate the correlation of the pair of respective time series charts with each other. The method may include randomly selecting, by the device, another pair of respective time series charts and another correlation detection technique based on the score or a value of a counter. The value of the counter may indicate a quantity of selections performed by the device. The method may include performing, by the device, one or more actions after randomly selecting the other pair of respective time series charts and the other correlation detection technique.

According to some possible implementations, a device may include one or more memories; and one or more processors, communicatively coupled to the one or more memories, to receive time series data from one or more data sources. The one or more processors may group the time series data based on multiple classifications included in the time series data. The one or more processors may generate a respective time series chart for the multiple classifications. The one or more processors may refine the time series data based on an amount of randomness detected in the respective time series chart for the multiple classifications. The one or more processors may randomly select a pair of respective time series charts and a correlation detection technique of a plurality of correlation detection techniques. The correlation detection technique may be associated with detecting a correlation of the pair of respective time series charts. The one or more processors may determine a score for the pair of respective time series charts based on the correlation of the pair of respective time series charts. The score may indicate an extent to which the pair of respective time series charts is correlated with each other. The one or more processors may perform one or more actions after determining the score for the pair of respective time series charts.

According to some possible implementations, a non-transitory computer-readable medium may store one or more instructions that, when executed by one or more processors, cause the one or more processors to receive time series data from one or more data sources. The one or more instructions, when executed by the one or more processors, may cause the one or more processors to pre-process the time series data to generate a respective time series chart for multiple classifications included in the time series data. The one or more instructions, when executed by the one or more processors, may cause the one or more processors to randomly select a pair of respective time series charts and a correlation detection technique, of a plurality of correlation detection techniques, after pre-processing the time series data. The one or more instructions, when executed by the one or more processors, may cause the one or more processors to determine a correlation for the pair of respective time series charts based on using the correlation detection technique. The one or more instructions, when executed by the one or more processors, may cause the one or more processors to determine a score for the pair of respective time series charts based on the correlation of the pair of respective time series charts. The score may indicate an extent to which the pair of respective time series charts is correlated with each other. The one or more instructions, when executed by the one or more processors, may cause the one or more processors to perform one or more actions after determining the score for the pair of respective time series charts.

BRIEF DESCRIPTION OF THE DRAWINGS

FIG. 5 is another flow chart of an example process for detecting correlation among sets of time series data.

DETAILED DESCRIPTION

Figure 1A:
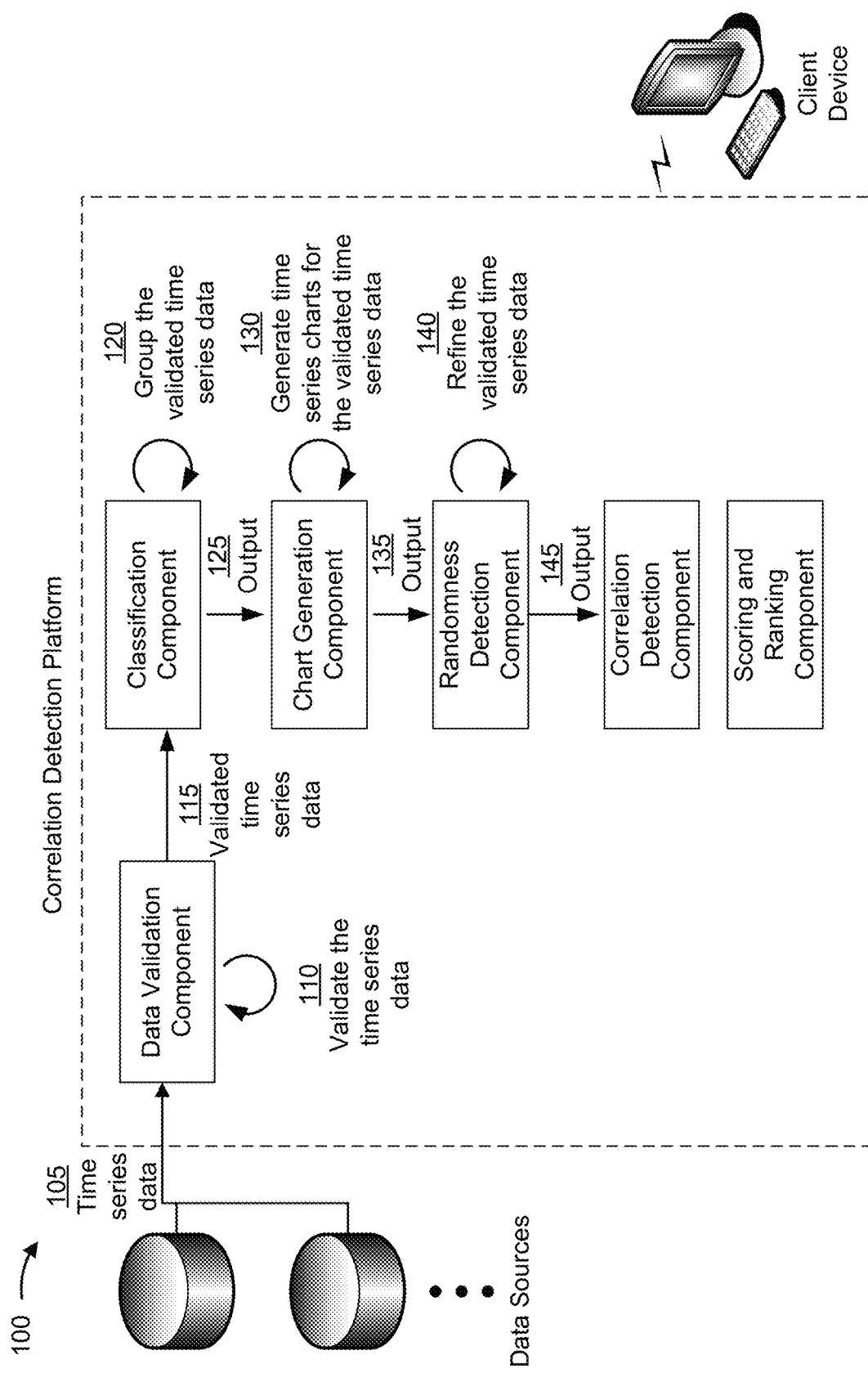
FIGS. 1A-1C are diagrams of an overview of an example implementation described herein.

The following detailed description of example implementations refers to the accompanying drawings. The same reference numbers in different drawings may identify the same or similar elements.

To operate efficiently and effectively, an organization may need information to understand the effects of decisions throughout the organization. As such, the organization may want to analyze data for the organization over time (e.g., time series data) across various aspects of the organization (e.g., departments, process flows, and/or the like) to identify an impact of a change to an aspect of the organization on another aspect of the organization. For example, the organization may want to analyze a manner in which a current advertising strategy of the organization is affecting sales for the organization, a manner in which a change in an information technology policy affects worker productivity, and/or the like). Traditionally, these types of analyses are performed by data scientists utilizing various computerized analysis tools and/or brute force (e.g., where all possible analyses are performed to identify an optimal solution). This can result in an analysis taking weeks or months to perform, thereby impeding operations of the organization, resulting in out-of-date analysis results, and/or the like. In addition, this type of analysis is prone to human subjectivity, which can negatively impact a result of this type of analysis. Further, some analyses that an organization may want to perform may be too complex for human analysis and/or for other tools.

Some implementations described herein provide a correlation detection platform that is capable of gathering millions, billions, or more data elements related to operations of an organization and efficiently analyzing the data to detect correlations among data related to different aspects of the organization. In this way, the correlation detection platform can perform detection of correlations faster than other tools. This improves a performance of this type of analysis and/or improves use of a result of this type of analysis by the organization by providing more temporally relevant results. In addition, the correlation detection platform may utilize cloud computing and/or machine learning techniques to perform correlation detection. This provides the correlation detection platform with a capability to processes data sets that are too large for a human actor, that are too complex to be analyzed by the human actor (even when assisted by a computerized analysis tool), and/or the like.

In addition, in this way, several different stages of the process for detecting correlations are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to detect correlations in data associated with an organization in a quick and efficient manner. Further, automating the process for detecting correlations in data conserves computing resources (e.g., processor resources, memory resources, and/or the like) that would otherwise be wasted performing an inaccurate and/or untimely manual analysis.

Figure 1B:
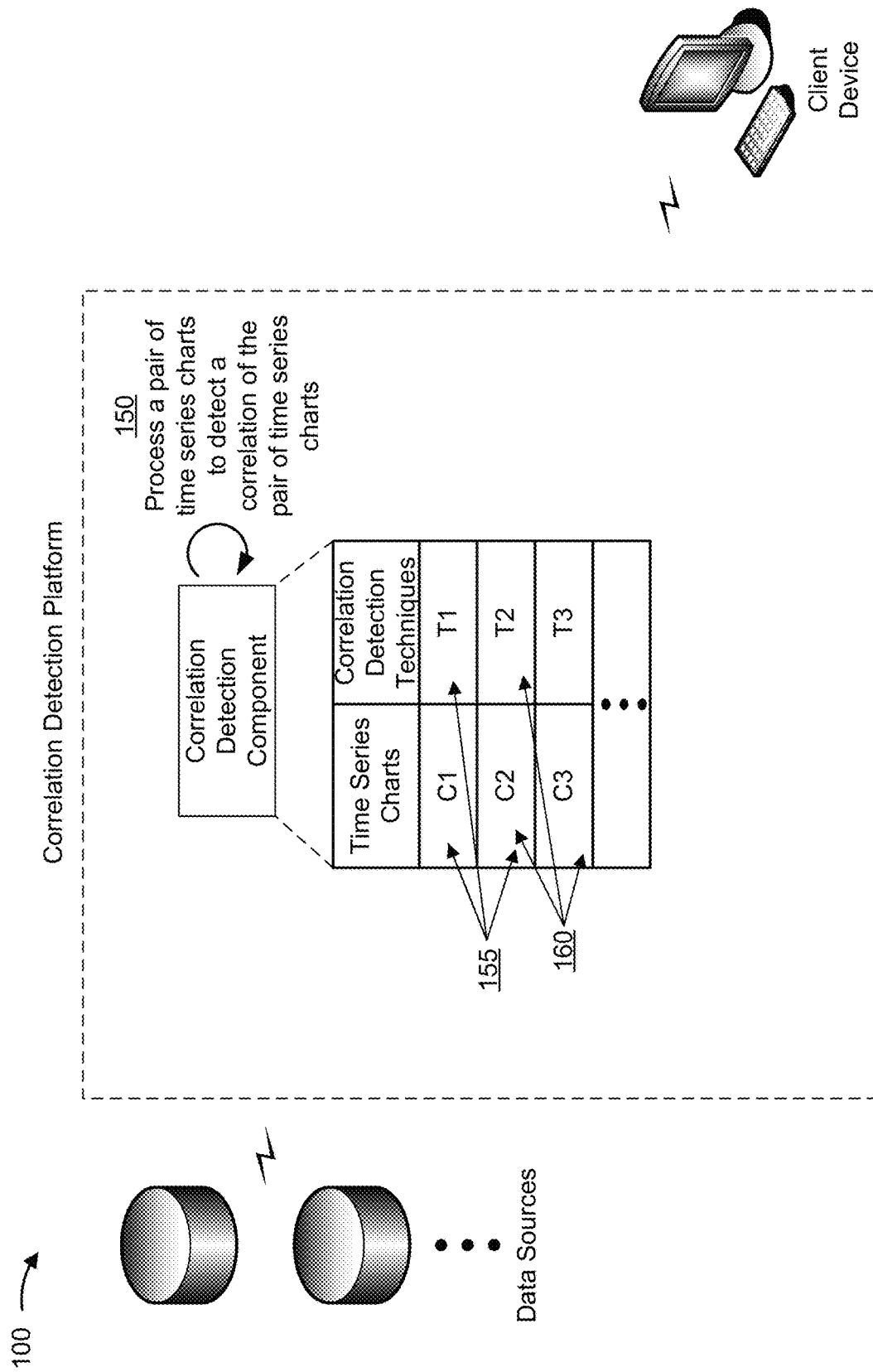
Figure 1C:
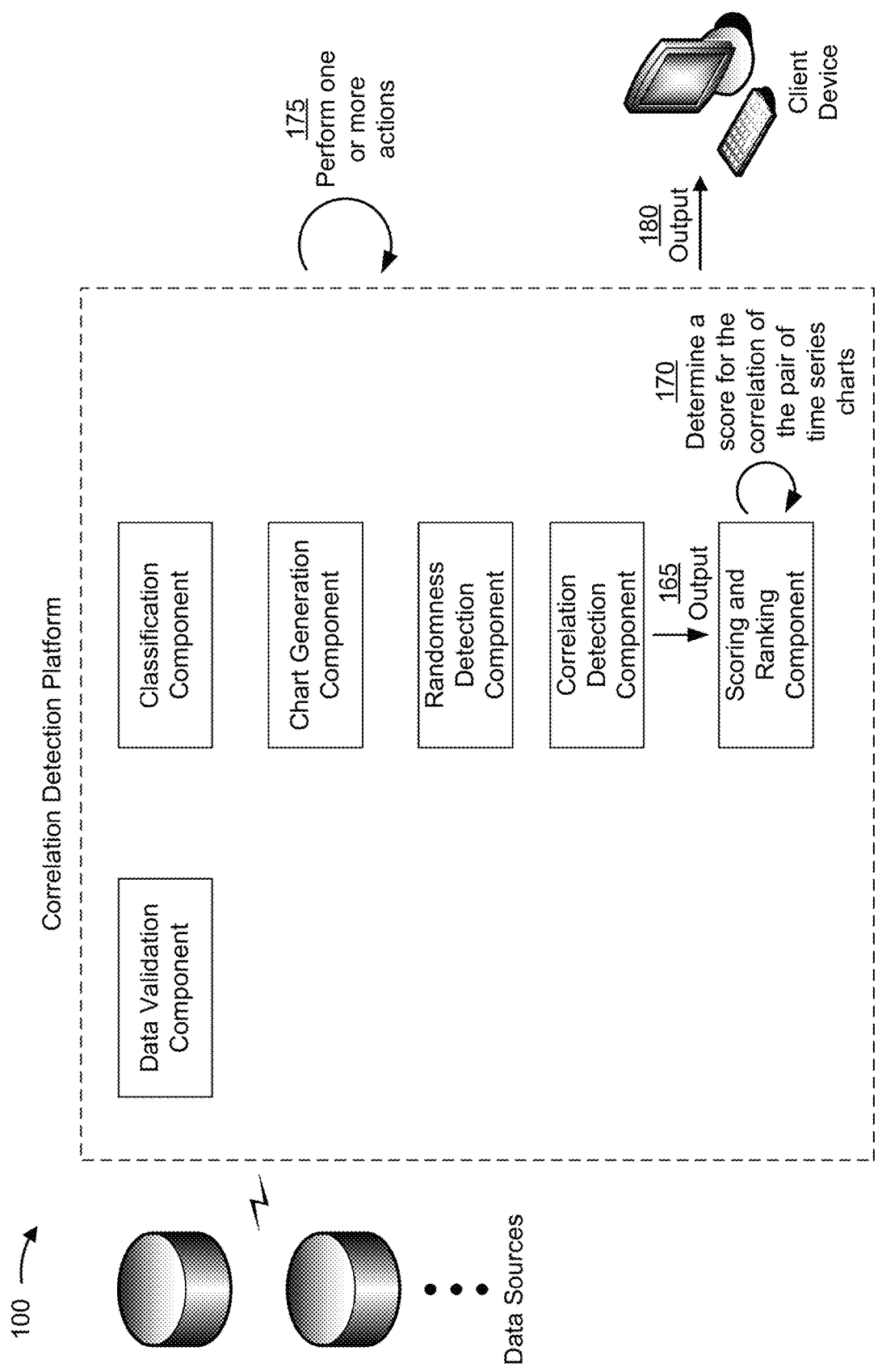

FIGS. 1A-1C are diagrams of an overview of an example implementation 100 described herein. As shown in FIG. 1A, implementation 100 includes a set of data sources, a data correlation detection platform that includes various components (e.g., shown as a data validation component, a classification component, a chart generation component, a randomness detection component, a correlation detection component, and a scoring and ranking component), and a client device.

As shown by reference number 105, the correlation detection platform may receive, from the set of data sources, time series data. For example, the time series data may be related to operations of an organization and the correlation detection platform may receive the time series data via the data validation component. In some implementations, a data source may include a data structure, a database, and/or the like that stores time series data. Additionally, or alternatively, the data source may include an application and/or a system that generates and/or gathers time series data related to an organization. For example, the data source may include an electronic commerce system associated with the organization, a payroll system, an email application, and/or the like. In some implementations, time series data may include data gathered over a period of time. For example, the time series data may include a date field, a time field, and/or the like.

In some implementations, the correlation detection platform may receive billions, trillions, or more data elements when receiving the time series data. In this way, the correlation detection platform may process a data set that cannot be processed manually or objectively by a human actor (e.g., in a consistent manner).

In some implementations, the correlation detection platform may receive the time series data in a streaming manner from the data source (e.g., in a continuous stream of time series data), according to a schedule, periodically, based on requesting the time series data via an application programming interface (API) between the correlation detection platform and the data source, and/or the like. Additionally, or alternatively, the correlation detection platform may receive the time series data when a user of the client device uploads the time series data. In some implementations, the time series data may be in the form of a spread sheet file, a comma-separated values (CSV) file, and/or the like.

In some implementations, the time series data may include various fields, such as a date field that indicates a date on which the time series data was gathered and/or generated and/or a time filed that indicates a time at which the time series data was gathered and/or generated. Additionally, or alternatively, the time series data may include a classification field that identifies a classification of the time series data. For example, the time series data may include employee identifiers when the time series data is associated with employees of the organization, customer identifiers when the time series data is associated with customers of the organization, application identifiers when the time series data is associated with applications associated with the organization, process identifiers when the time series data is associated with processes of the organization, and/or the like. Additionally, or alternatively, the time series data may include various other fields for values that are gathered and/or generated over time (e.g., a number of employees for the organization, a quantity of successful logins to an application, and/or the like) and which may be the subject of a correlation detection analysis described elsewhere herein.

In some implementations, the time series data may include data elements for unrelated aspects of the organization. For example, the time series data may include data elements for a quantity of employee hires and/or resignations over a period of time, a quantity of customer refunds completed for the same period of time, and/or the like. In this way, the correlation detection platform may use the time series data to perform an analysis that cannot be performed by a human actor and/or that was not previously possible.

As shown by reference number 110, the correlation detection platform, using the data validation component, may validate the time series data. For example, the correlation detection platform may utilize the data validation component to validate the time series data to form validated time series data.

In some implementations, the correlation detection platform may determine whether the time series data includes particular fields (e.g., a date field, a time field, a classification field, and/or the like). Additionally, or alternatively, the correlation detection platform may determine whether the time series data is corrupted. In this case, the correlation detection platform may re-request the time series data from the appropriate data source, may output a notification for display via the client device indicating that the time series data includes corrupted data elements, and/or the like.

Additionally, or alternatively, the correlation detection platform may determine whether the time series data is properly formatted. For example, the correlation detection platform may determine whether values in a date field are in a MMDDYYYY format, a MM/DD/YY format, and/or the like, whether values in an employee identifier field include a particular quantity of digits, and/or the like. In some implementations, the correlation detection platform may perform one or more other types of data validation, such as determining whether the time series data is associated with a particular period of time, whether data elements are missing from the time series data (e.g., whether the time series data is missing a data element for a particular time), and/or the like. In some implementations, the correlation detection platform may perform an action to place the time series data in a validated form, such as replacing corrupted data, obtaining missing data, formatting improperly formatted data, and/or the like. This conserves processing resources that would otherwise be consumed attempting to process time series data that includes an error, that is corrupted, that is not properly formatted, and/or the like.

As shown by reference number 115, the correlation detection platform may provide validated time series data from the data validation component to the classification component. For example, the data validation component may provide the validated time series data when the data validation component has completed validating the time series data (e.g., automatically), based on the correlation detection platform causing the data validation component to provide the validated data, according to a schedule, periodically, based on the classification component requesting the validated time series data, and/or the like.

As shown by reference number 120, the correlation detection platform may use the classification component to group the validated time series data. For example, the correlation detection platform may utilize the classification component to group the validated time series data based on classifications included in the validated time series data (e.g., values included in a classification field of the validated time series data).

In some implementations, the correlation detection platform may identify classifications included in the validated time series (e.g., prior to grouping the validated time series data). In some implementations, the correlation detection platform may identify the classifications by identifying different classification identifiers included in the validated time series data (e.g., may identify employee identifiers included in the validated time series data, may identify customer identifiers included in the validated time series data, may identify application identifiers included in the validated time series data, and/or the like).

Additionally, or alternatively, the correlation detection platform may utilize a machine learning module and/or a text processing technique (e.g., a natural language processing technique, a computational linguistics technique, and/or the like) to identify data elements associated with the same classification. For example, the correlation detection platform may utilize the natural language processing technique to identify misspelled classification identifiers and/or classification identifiers that include an error, textually similar classification identifiers (e.g., the classification identifiers "customer" and "patron"), variations of a term associated with the same classification (e.g., "customer" and "cust."), and/or the like.

Additionally, or alternatively, the correlation detection platform may utilize the machine learning module to identify similar classifications and/or classifications that are to be grouped together. For example, the machine learning module may have been trained on a training set of data that includes classification identifiers and corresponding information identifying groupings of the classification identifiers, that includes values for various attributes in the time series data and information that identifies corresponding classifications for the values, and/or the like. Continuing with the previous example, the machine learning module may utilize the training set of data to train a model to identify classifications and/or other data elements in validated time series data to group together.

As specific examples, the training set of data may include information that identifies groupings of time series data that were previously generated by a human actor, that were identified for another organization than for the organization being analyzed, and/or the like. In this way, the correlation detection platform, via the machine learning module, may be capable of processing noisy, imprecise, or incomplete data, of extracting patterns that are too complex to be noticed by humans or other computer-based techniques, of learning relationships in data, and/or the like. This improves functioning of the correlation detection platform by reducing or eliminating a need for human intervention in identifying groupings, by providing the correlation detection platform with a capability to group validated time series data in a manner that is more complicated than grouping data elements by common classification identifier, and/or the like.

In some implementations, the correlation detection platform may output, for display via the client device, information that identifies groupings of classifications that the correlation detection platform identified. For example, the correlation detection platform may output the information to request input, from a user of the client device, confirming the groupings. In some implementations, the correlation detection platform may detect a modification to the groupings of classifications based on a user interaction with the information output via the client device. For example, the user of the client device may interact with a user interface to ungroup some classifications, to group other classifications, and/or the like.

In some implementations, the correlation detection platform may receive information identifying these modifications from the client device and may update the machine learning module based on the information identifying the modifications. For example, the correlation detection platform may utilize the information identifying the modifications as a training set of data for the machine learning module to improve future identification of groupings of classifications. Continuing with the previous example, the correlation detection platform may update the machine learning module for future identifications for the same organization being analyzed, for different organizations, for the particular user of the client device (e.g., as determined by login logs, login credentials, and/or the like associated with the particular user), and/or the like.

In some implementations, the correlation detection platform may separate the validated time series data by groupings of classifications. For example, the correlation detection platform may generate a respective spreadsheet in a spreadsheet workbook for the groupings of classifications. Additionally, or alternatively, the correlation detection platform may generate respective CSV files for the groupings of classifications. In this way, the correlation detection platform may process validated time series data for various groupings easily and separately.

As shown by reference number 125, the correlation detection platform may provide output from the classification component to the chart generation component. For example, the classification component may provide the output to the chart generation component after grouping the validated time series data (e.g., automatically), based on receiving a request for the output from the chart generation component, based on the correlation detection platform causing the classification component to provide the output, according to a schedule, periodically, and/or the like. In some implementations, the output may include information that identifies the groupings of the classifications, a respective file of validated time series data for classifications identified in the validated time series data (e.g., a spreadsheet workbook that includes a respective spreadsheet for the classifications identified in the validated time series data, respective CSV files for the classifications identified in the validated time series data, and/or the like), and/or the like.

As shown by reference number 130, the correlation detection platform may utilize the chart generation component to generate time series charts for the validated time series data. For example, the correlation detection platform may utilize the chart generation component to generate the time series charts. In some implementations, a time series chart may include a data visualization tool that illustrates validated time series data at successive intervals of time (e.g., where a point on the chart corresponds to both a time and a value that is being measured). In some implementations, a time series chart may include a virtual or machine readable chart. Additionally, or alternatively, a time series chart may include a graphical chart (e.g., that could be output for display via the client device).

In some implementations, to generate a time series chart, the correlation detection platform may plot validated time series data for a classification on a corresponding virtual chart. For example, the correlation detection platform may plot measured values for various attributes included in the validated time series data (e.g., other than a date field, a time field, and a classification field) over time based on a date value and/or a time value included in the validated time series data. In some implementations, the correlation detection platform may generate a respective time series chart for classifications identified in the validated time series data. In some implementations, the correlation detection platform may store the time series charts after generating the time series charts.

As shown by reference number 135, the correlation detection platform may provide output from the chart generation component to the randomness detection component. For example, the chart generation component may provide the output to the randomness detection component after generating the time series charts (e.g., automatically), based on receiving a request for the output from the randomness detection component, based on the correlation detection platform causing the chart generation component to provide the output, according to a schedule, periodically, and/or the like. In some implementations, the output may include the time series charts that the chart generation component generated.

As shown by reference number 140, the correlation detection platform may utilize the randomness detection component to refine the validated time series data (e.g., utilizing a randomness detection technique). In some implementations, a randomness detection technique may include a data analysis technique used to analyze a distribution of the validated time series data plotted on a time series chart to determine whether the validated time series data is random (e.g., does not include a pattern or trend), includes an amount of randomness that satisfies a threshold (e.g., includes a weak pattern or trend), and/or the like. For example, a randomness detection technique may include a runs test, a frequency test, a serial test, and/or the like.

In some implementations, the correlation detection platform may process a time series chart to determine an amount of randomness included in the time series chart using a randomness detection technique. For example, the correlation detection platform may process a time series chart to determine whether the time series chart includes a pattern of values, a trend of values, and/or the like. In some implementations, the correlation detection platform may determine that an amount of randomness included in a time series chart satisfies a threshold and may remove the time series chart from further processing (e.g., may delete the time series chart).

In this way, the correlation detection platform removes a time series chart that cannot be used to identify a correlation with other time series charts (or that is associated with a threshold likelihood of not being capable of being used to identify a correlation with other time series charts). This conserves processing resources of the correlation detection platform that would otherwise be consumed using a time series chart that includes an amount of randomness that satisfies a threshold to determine whether the time series chart is correlated with other time series charts. In addition, this conserves memory resources that would otherwise be consumed storing the time series chart.

In some implementations, the correlation detection platform may store information identifying the time series charts that are removed to prevent the correlation detection platform from generating the same time series chart in the future, to cause the correlation detection platform to determine whether the validated time series data for the corresponding classification of the time series chart that was removed still includes a threshold amount of randomness before generating a time series chart for the validated time series data in the future, and/or the like. This conserves processing resources of the correlation detection platform that would otherwise be consumed generating a time series chart for the validated time series data in the future when the validated time series data still includes an amount of randomness that satisfies a threshold.

As shown by reference number 145, the randomness detection component may provide output to the correlation detection component. For example, the randomness detection component may provide the output to the correlation detection component after refining the validated time series data (e.g., automatically), based on receiving a request for the output from the correlation detection component, based on the correlation detection platform causing the randomness detection component to provide the output, according to a schedule, periodically, and/or the like. In some implementations, the output may include a set of refined time series charts (e.g., where time series charts that include an amount of randomness that satisfies a threshold have been removed).

Turning to FIG. 1B, and as shown by reference number 150, the correlation detection platform may utilize the correlation detection component to process a pair of time series charts to detect a correlation of the pair of time series charts. In some implementations, the correlation detection platform may process the pair of time series charts using a correlation detection technique to determine a correlation of the pair of time series charts, a correlation coefficient for the pair of time series charts, and/or the like. For example, a correlation detection technique may include a Pearson correlation technique, a seasonal Kendall technique, a Kendall's tau technique, and/or the like.

In some implementations, the correlation detection platform may randomly select the pair of time series charts to be processed from a set of time series charts (e.g., that has been refined as described above). For example, the time series charts may be associated with a respective number between 1 and M (where M is equal to the quantity of time series charts in the set of time series charts). Continuing with the previous example, the correlation detection platform may utilize a random number generator to generate two non-repeating numbers between 1 and M and may select the time series charts that correspond to the numbers as the pair of time series charts to be processed. In some implementations, the correlation detection platform may randomly select multiple pairs of time series charts for parallel processing (e.g., on different instances of computing resources of the correlation detection platform). This reduces an amount of time needed to process the set of time series charts. In addition, by randomly selecting pairs of time series charts for processing, the correlation detection platform reduces or eliminates human subjectivity that would otherwise be present in other techniques for processing similar time series charts.

In some implementations, the correlation detection platform may randomly select a correlation detection technique from a set of correlation detection techniques. For example, the correlation detection platform may randomly select a correlation detection technique in a manner that is the same as or similar to that described with regard to randomly selecting a pair of time series charts (e.g., utilizing a random number generator). In some implementations, the correlation detection platform may store information identifying pairs of time series charts that have been randomly selected and/or a correlation detection technique that was randomly selected for the pair of time series charts. This may prevent the correlation detection platform from selecting the same pair of time series charts for processing in the future, from selecting the same pair of time series charts for processing with the same correlation detection technique in the future, and/or the like.

Reference numbers 155 and 160 show examples of selecting pairs of time series charts and a respective correlation detection technique for processing. For example, reference number 155 shows the correlation detection platform selecting a first pair of time series charts (e.g., time series chart C1 and time series chart C2) and a corresponding correlation detection technique (e.g., correlation detection technique T1). Additionally, or alternatively, and as another example, reference number 160 shows the correlation detection platform selecting a second pair of time series charts (e.g., time series chart C2 and time series chart C3) and a corresponding correlation detection technique (e.g., correlation detection technique T2). In some implementations, the correlation detection platform may select a particular time series chart and/or a particular correlation detection technique one or more times.

In some implementations, the correlation detection platform may overlay the pair of time series charts on each other and may process the pair of time series charts using the correlation detection technique to determine a correlation of the pair of time series charts. For example, a correlation may include a positive correlation, a negative correlation, a strong positive correlation, a weak negative correlation, and/or the like. In this way, the correlation detection platform may be capable of quickly and easily identifying a correlation between the pair of time series charts. In some implementations, the correlation detection platform may store information identifying the correlation of the pair of time series charts.

In some implementations, the correlation detection platform may randomly select additional pairs of time series charts and a respective correlation detection technique for processing the pairs of time series charts, in a manner that is the same as or similar to that described elsewhere herein. In some implementations, the correlation detection platform may select the additional pairs of time series charts based on a respective correlation for prior pairs of time series charts that the correlation detection platform processed. For example, the correlation detection platform may use the pair of time series charts (or corresponding validated time series data) and information identifying a correlation of the pair of time series charts as input to a machine learning module so that the correlation detection platform can be trained to more accurately identify pairs of time series charts that are likely to be associated with a positive correlation, to identify pairs of time series charts that are likely to be associated with a negative correlation, to avoid pairs of time series charts that are not likely to be correlated, and/or the like. This improves a functioning of the correlation detection platform by providing the correlation detection platform with the capability to more intelligently identify pairs of time series charts that are likely to be of interest to a user of the client device, that are associated with a goal of the organization, and/or the like.

In some implementations, the correlation detection platform may randomly select additional pairs of time series charts until a quantity of pairs of time series charts that has been selected satisfies a threshold. For example, the correlation detection platform may randomly select additional pairs of time series charts until the correlation detection platform has selected a selection threshold of 100 pairs of time series charts, has selected 10,000 pairs of time series charts, has selected 85 percent of the possible pairs of time series charts, has selected 25 percent of the possible pairs of time series charts, has selected each time series chart for inclusion in a pair of time series charts at least a threshold quantity of times, and/or the like. Additionally, or alternatively, the correlation detection platform may randomly select additional pairs of time series charts until respective correlations for a threshold quantity of previous selections fail to improve by an amount that satisfies a threshold (e.g., fail to satisfy a correlation threshold). For example, the correlation detection platform may randomly select additional pairs of time series charts until respective scores (described below) for a threshold quantity of previous selections fail to improve by an amount that satisfies a threshold (e.g., the respective scores for the previous 100 selections fail to improve by at least five percent for successive previous selections).

This conserves processing resources of the correlation detection platform by reducing or eliminating a need for the correlation detection platform to use a brute force method to process pairs of time series charts (e.g., a method that includes processing all possible pairs of time series charts). In addition, in this way, the correlation detection platform may utilize an evolutionary algorithm in association with randomly selecting additional pairs of respective time series charts (e.g., such that a machine learning module associated with the correlation detection platform is updated based on previous selections).

Turning to FIG. 1C, and as shown by reference number 165, the correlation detection platform may provide output from the correlation detection component to the scoring and ranking component. For example, the correlation detection component may provide the output to the scoring and ranking component after processing a pair of time series charts using a correlation detection technique (e.g., automatically), based on receiving a request for the output from the scoring and ranking component, based on the correlation detection platform causing the scoring and ranking component to provide the output, according to a schedule, periodically, and/or the like. In some implementations, the output may include information that identifies a correlation of a pair of time series charts, a strength of the correlation, and/or the like. In some implementations, the output may include a correlation coefficient (e.g., a number between negative 1 and positive 1) that indicates an extent to which the pair of time series charts are correlated.

As shown by reference number 170, the correlation detection platform, utilizing the scoring and ranking component, may determine a score for the correlation of the pair of time series charts. For example, the correlation detection platform may determine the score based on the correlation (e.g., whether the correlation is a positive correlation, a negative correlation, a neutral correlation, and/or the like), a strength of the correlation (e.g., whether the correlation is a strong positive or negative correlation, a weak positive or negative correlation, and/or the like), a correlation coefficient for the correlation (e.g., the value of the correlation coefficient, an absolute value of the correlation coefficient, and/or the like), and/or the like. In some implementations, the score may be a weighted score (e.g., based on the time series charts included in the pair of time series charts associated with the score), an average score (e.g., an average of scores for a respective result of using multiple correlation detection techniques to process the pair of time series charts), and/or the like.

In some implementations, the correlation detection platform may rank different pairs of time series charts based on a respective score for the different pairs of time series charts. For example, the correlation detection platform may rank the different pairs of time series charts from highest score to lowest score, from lowest score to highest score, and/or the like. In this way, the correlation detection platform can identify pairs of time series charts that are likely to be of interest to the user of the client device.

As shown by reference number 175, the correlation detection platform may perform one or more actions. For example, the correlation detection platform may perform the one or more actions after determining the score for the correlation of the pair of time series charts. In some implementations, and as shown by reference number 180, the correlation detection platform may provide output for display via the client device. For example, the output may identify a respective score and/or a rank for pairs of time series charts, the time series charts associated with a pair of time series charts, and/or the like.

In some implementations, the correlation detection platform may receive information that indicates that a pair of time series charts is of interest to a user of the client device. For example, the correlation detection platform may detect interactions with the output (e.g., selections of particular pairs of time series charts on a user interface, whether the user selects a button on a user interface to view time series charts associated with a pair of time series charts, and/or the like). Additionally, or alternatively, and as another example, the user of the client device may indicate via input to the client device, whether output is of interest (e.g., may input a score for a pair of time series charts, may input a binary indication of whether the information related to a pair of time series charts is of interest, and/or the like) and the correlation detection platform may receive information that identifies these indications.

In some implementations, the correlation detection platform may use the information that indicates that a pair of time series charts is of interest as a training set for a machine learning module. For example, the correlation detection platform may use information that identifies which output (e.g., which pairs of time series charts) the user of the client device interacted with via a user interface, an amount of time the user interacted with the output, and/or the like, along with the output with which the user interacted (e.g., pairs of time series charts, a respective score and/or rank, and/or the like), as the training set for the machine learning module. This may facilitate training of the machine learning module such that the correlation detection platform can identify pairs of time series charts that are likely to be of interest to a user of the client device. This improves functioning of the correlation detection platform by facilitating more intelligent selection of pairs of time series charts. In addition, this conserves processing resources of the correlation detection platform that would otherwise be consumed processing pairs of time series charts that are not likely to be of interest to the user of the client device.

In some implementations, the correlation detection platform may generate a report that includes information that identifies a score for a pair of time series charts and may output the report to the client device for display via a user interface. Additionally, or alternatively, the correlation detection platform may send a message to a client device for display (e.g., that includes information identifying a score and/or a rank for a pair of time series charts). Additionally, or alternatively, the correlation detection platform may trigger an alarm (e.g., via the client device), such as when a score satisfies a threshold.

In some implementations, the correlation detection platform may perform the processes described above for hundreds, thousands, or more organizations, for data sets that include billions, trillions, or more data elements, and/or the like. In this way, the correlation detection platform provides an organization with a tool, not previously available, for processing time series charts for correlation detection in a manner not previously possible and not possible by a human actor.

In this way, the correlation detection platform may intelligently and efficiently process pairs of time series charts for time series data related to an organization to identify correlations among the pairs of time series charts. This reduces an amount of time needed for identifying the correlations relative to other techniques for processing similar data. Further, this reduces or eliminates a need to perform a brute force processing of all possible pairs of time series charts, thereby conserving processing resources of performing this type of analysis relative to a technique that uses brute force processing. Further, this optimizes use of computing resources to perform this type of processing of data relative to other techniques.

As indicated above, FIGS. 1A-1C are provided merely as an example. Other examples are possible and may differ from what was described with regard to FIGS. 1A-1C.

Figure 2:
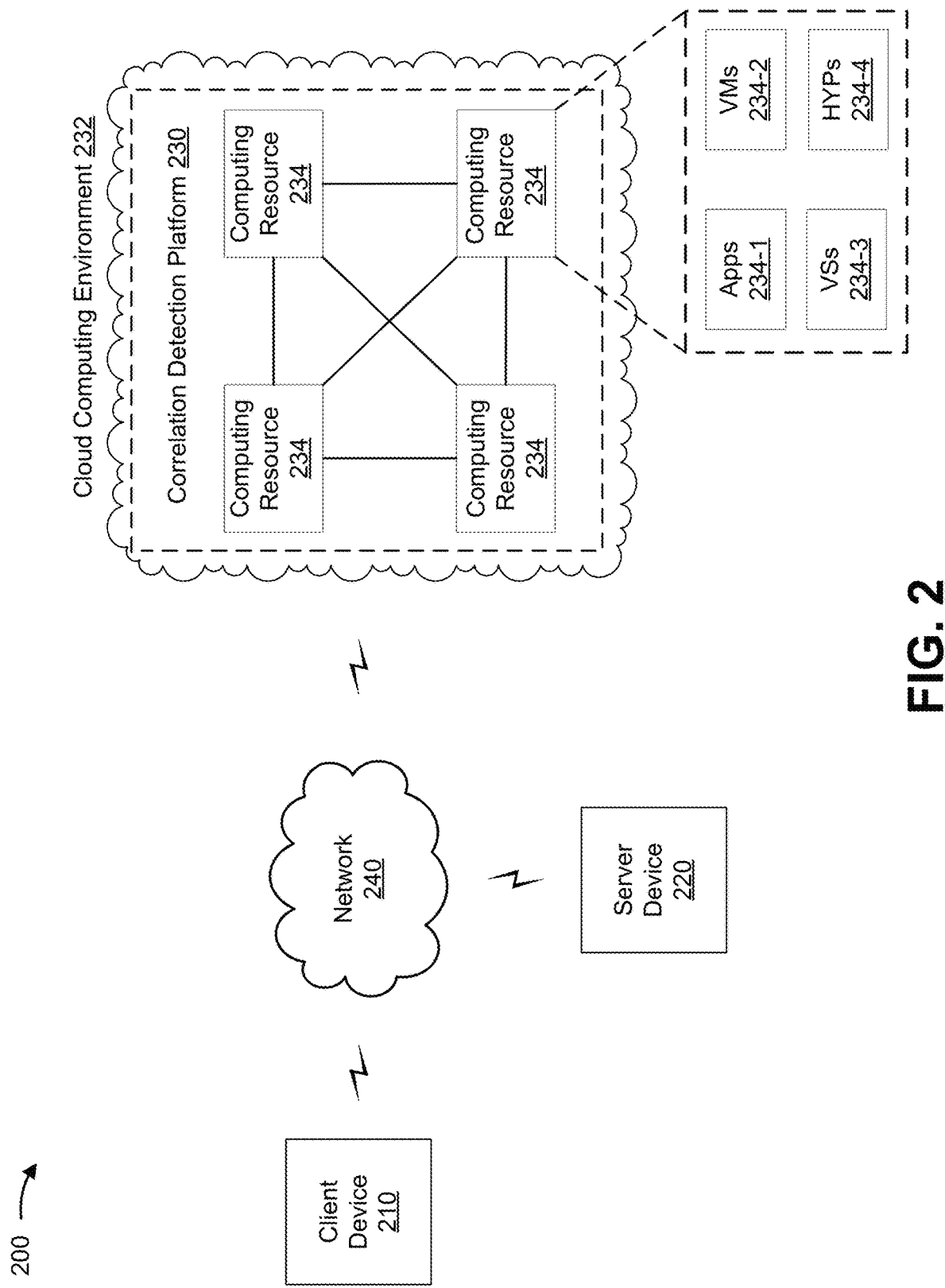
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, a correlation detection platform 230 in a cloud computing environment 232 that includes a set of computing resources 234, and a network 240. Devices of environment 200 may interconnect via wired connections, wireless connections, or a combination of wired and wireless connections.

Client device 210 includes one or more devices capable of receiving, generating, storing, processing, and/or providing information associated with aspects of an organization to be analyzed. For example, client device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, client device 210 may client device 210 may receive output from correlation detection platform 230 (e.g., output that identifies a respective correlation of pairs of time series charts) and may provide the output for display, as described elsewhere herein. Additionally, or alternatively, correlation detection platform 230 may provide input to correlation detection platform 230 (e.g., input to be used to train a machine learning module for selection of pairs of time series charts), as described elsewhere herein.

Server device 220 includes one or more devices capable of receiving, generating storing, processing, and/or providing information associated with aspects of an organization to be analyzed. For example, server device 220 may include a server (e.g., in a data center or a cloud computing environment), a data center (e.g., a multi-server micro datacenter), a workstation computer, a virtual machine (VM) provided in a cloud computing environment, or a similar type of device. In some implementations, server device 220 may include a communication interface that allows server device 220 to receive information from and/or transmit information to other devices in environment 200. In some implementations, server device 220 may be a physical device implemented within a housing, such as a chassis. In some implementations, server device 220 may be a virtual device implemented by one or more computer devices of a cloud computing environment or a data center. In some implementations, server device 220 may provide, to correlation detection platform 230, time series data associated with aspects of an organization to be analyzed, as described elsewhere herein.

Correlation detection platform 230 includes one or more devices capable of receiving, generating, storing, processing, and/or providing information associated with aspects of an organization to be analyzed. For example, correlation detection platform 230 may include a cloud server or a group of cloud servers. In some implementations, correlation detection platform 230 may be designed to be modular such that certain software components can be swapped in or out depending on a particular need. As such, correlation detection platform 230 may be easily and/or quickly reconfigured for different uses.

In some implementations, as shown, correlation detection platform 230 may be hosted in cloud computing environment 232. Notably, while implementations described herein describe correlation detection platform 230 as being hosted in cloud computing environment 232, in some implementations, correlation detection platform 230 may not be cloud-based (i.e., may be implemented outside of a cloud computing environment) or may be partially cloud-based.

Cloud computing environment 232 includes an environment that hosts correlation detection platform 230. Cloud computing environment 232 may provide computation, software, data access, storage, and/or other services that do not require end-user knowledge of a physical location and configuration of a system and/or a device that hosts correlation detection platform 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device.

In some implementations, computing resource 234 may host correlation detection platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with correlation detection platform 230 and/or any other software capable of being provided via cloud computing environment 232. In some implementations, one application 234-1 may send/receive information to/from one or more other applications 234-1, via virtual machine 234-2. In some implementations, application 234-1 may include a software application associated with one or more databases and/or operating systems. For example, application 234-1 may include an enterprise application, a functional application, an analytics application, and/or the like.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of client device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
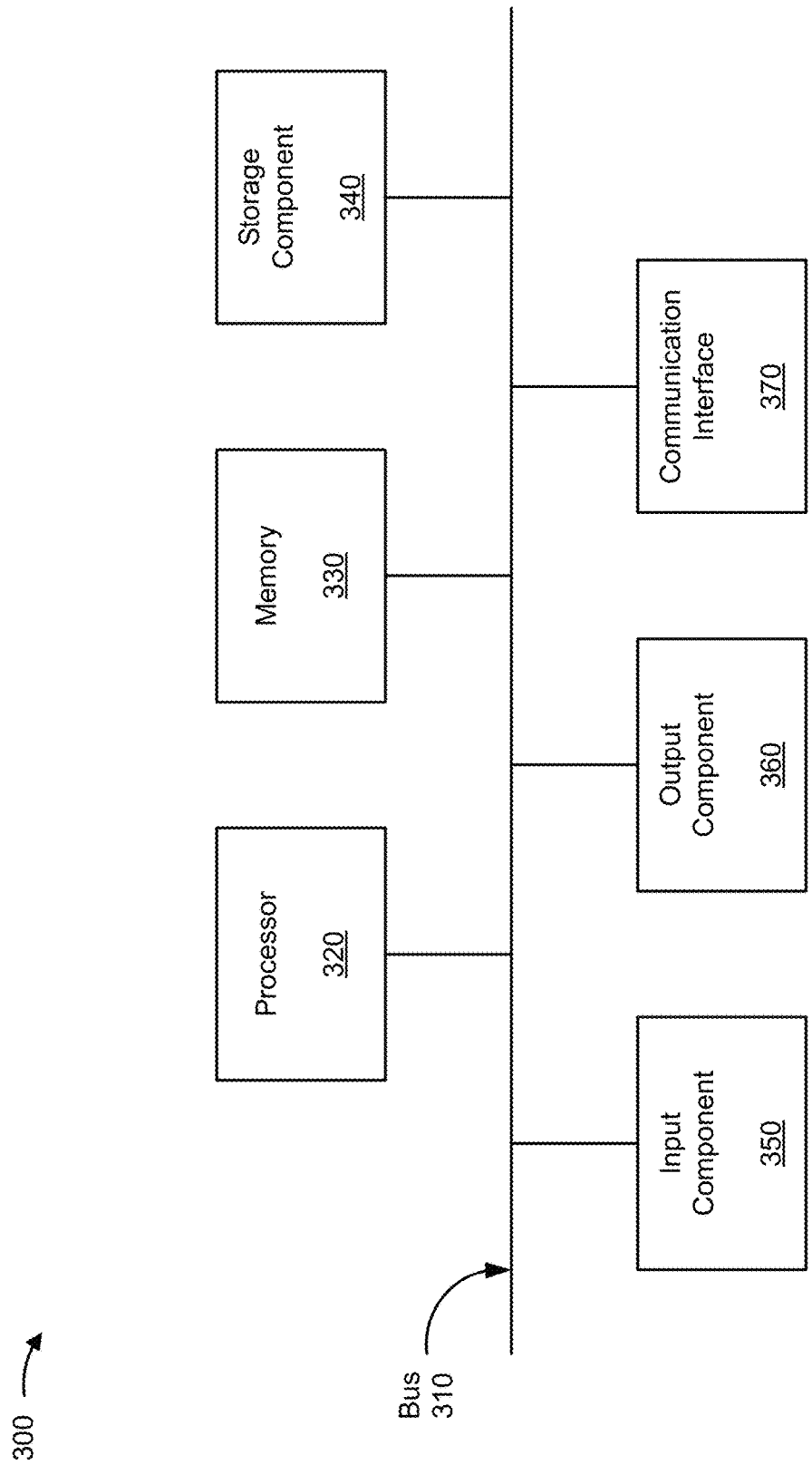
FIG. 3 is a diagram of example components of one or more devices of FIG. 2.

FIG. 3 is a diagram of example components of a device 300. Device 300 may correspond to client device 210, server device 220, correlation detection platform 230, and/or computing resource 234. In some implementations, client device 210, server device 220, correlation detection platform 230, and/or computing resource 234 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
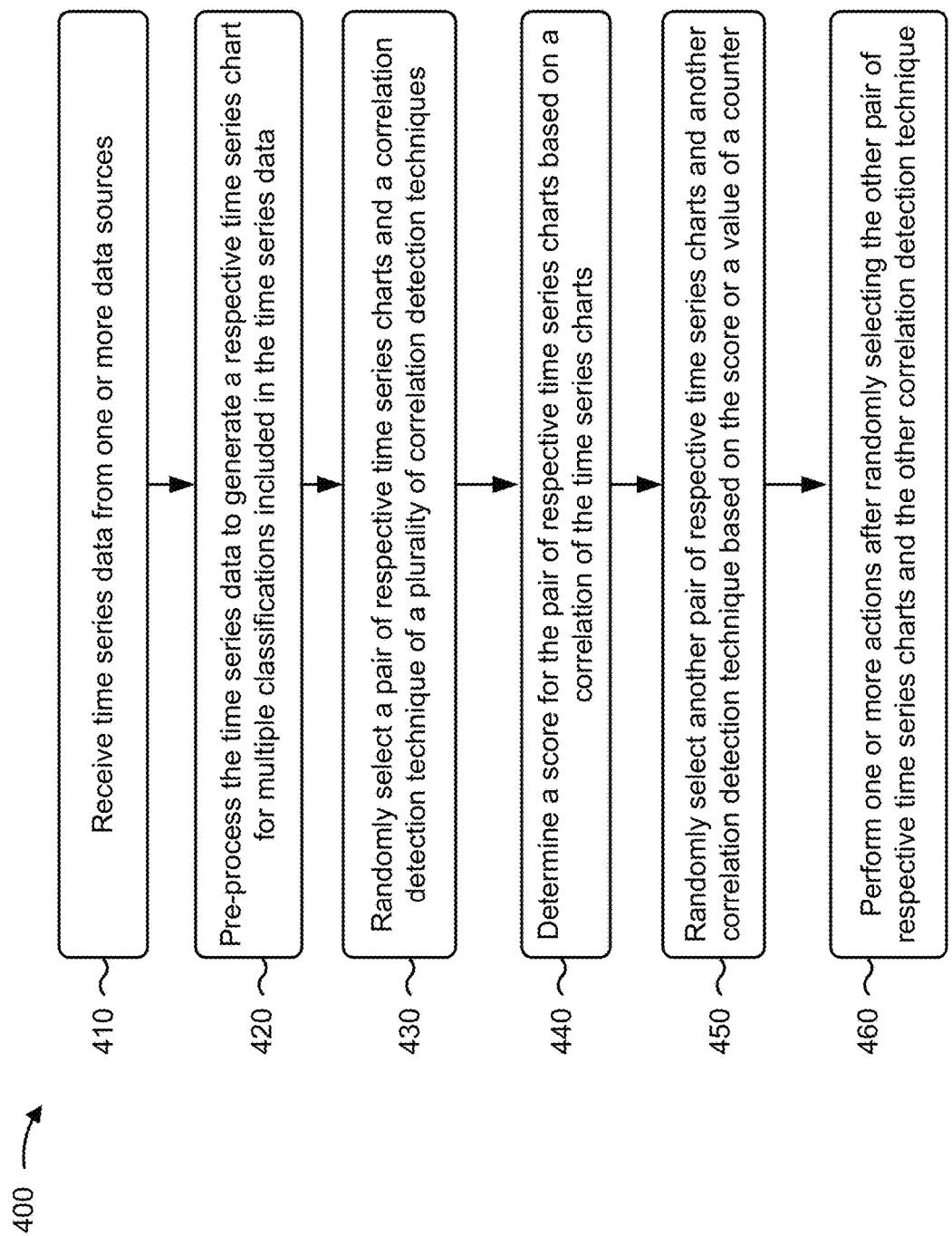
FIG. 4 is a flow chart of an example process for detecting correlation among sets of time series data.

FIG. 4 is a flow chart of an example process 400 for detecting correlation among sets of time series data. In some implementations, one or more process blocks of FIG. 4 may be performed by a correlation detection platform (e.g., correlation detection platform 230). In some implementations, one or more process blocks of FIG. 4 may be performed by another device or a group of devices separate from or including the correlation detection platform, such as a client device (e.g., client device 210) or a server device (e.g., server device 220).

As shown in FIG. 4, process 400 may include receiving time series data from one or more data sources (block 410). For example, the correlation detection platform (e.g., using computing resource 234, processor 320, input component 350, communication interface 370, and/or the like) may receive time series data from one or more data sources.

In some implementations, the correlation detection component may receive the time series data in a manner that is the same as or similar to that described with regard to FIGS. 1A-1C. For example, the correlation detection platform may receive the time series data from a data source (e.g., a server device) and using a data validation component.

As further shown in FIG. 4, process 400 may include pre-processing the time series data to generate a respective time series chart for multiple classifications included in the time series data (block 420). For example, the correlation detection platform (e.g., using computing resource 234, processor 320, memory 330, and/or the like) may pre-process the time series data to generate a respective time series chart for multiple classifications included in the time series data.

In some implementations, the correlation detection platform may pre-process the time series data in a manner that is the same as or similar to that described with regard to FIGS. 1A-1C. For example, the correlation detection platform may pre-process the time series data using a classification component, a chart generation component, and/or a randomness detection component.

As further shown in FIG. 4, process 400 may include randomly selecting a pair of respective time series charts and a correlation detection technique of a plurality of correlation detection techniques (block 430). For example, the correlation detection platform (e.g., using computing resource 234, processor 320, memory 330, and/or the like) may randomly select a pair of respective time series charts and a correlation detection technique of a plurality of correlation detection techniques.

In some implementations, the correlation detection platform may randomly select a pair of respective time series charts and a correlation detection technique in a manner that is the same as or similar to that described with regard to FIGS. 1A-1C. For example, the correlation detection platform may randomly select a pair of respective time series charts and a correlation detection technique using a correlation detection component.

As further shown in FIG. 4, process 400 may include determining a score for the pair of respective time series charts based on the correlation of the pair of respective time series charts (block 440). For example, the correlation detection platform (e.g., using computing resource 234, processor 320, memory 330, and/or the like) may determine a score for the pair of respective time series charts based on the correlation of the pair of respective time series charts.

In some implementations, the correlation detection platform may determine a score for the pair of respective time series charts in a manner that is the same as or similar to that described with regard to FIGS. 1A-1C. For example, the correlation detection platform may determine a score for the pair of respective time series charts using a correlation detection component and/or using a scoring and ranking component.

As further shown in FIG. 4, process 400 may include randomly selecting another pair of respective time series charts and another correlation detection technique based on the score or a value of a counter (block 450). For example, the correlation detection platform (e.g., using computing resource 234, processor 320, and/or the like) may randomly select another pair of respective time series charts and another correlation detection technique based on the score or a value of a counter.

In some implementations, the correlation detection platform may randomly select another pair of respective time series charts and another correlation detection technique in a manner that is the same as or similar to that described with regard to FIGS. 1A-1C. For example, the correlation detection platform may randomly select another pair of respective time series charts and another correlation detection technique using a correlation detection component.

As further shown in FIG. 4, process 400 may include performing one or more actions after randomly selecting the other pair of respective time series charts and the other correlation detection technique (block 460). For example, the correlation detection platform (e.g., using computing resource 234, processor 320, memory 330, output component 360, communication interface 370, and/or the like) may perform one or more actions after randomly selecting the other pair of respective time series charts and the other correlation detection technique.

In some implementations, the correlation detection platform may perform one or more actions in a manner that is the same as or similar to that described with regard to FIGS. 1A-1C. For example, the correlation detection platform may output a result of analyzing pairs of time series charts for display to the client device.

Process 400 may include additional implementations, such as any single implementation or any combination of implementations described below.

In some implementations, the correlation detection technique may include at least one of a Pearson correlation technique, a seasonal Kendall technique, or a Kendall's tau technique. In some implementations, the correlation detection technique may be associated with detecting a correlation of the pair of respective time series charts. In some implementations, the score may indicate the correlation of the pair of respective time series charts with each other. In some implementations, the value of the counter may indicate a quantity of selections performed by the device.

In some implementations, the correlation detection platform may group the time series data according to the multiple classifications included in the time series data after receiving the time series data, and may generate the respective time series chart for the multiple classifications after grouping the time series data. In some implementations, the correlation detection platform may refine the respective time series chart for the multiple classifications based on an amount of randomness identified in the respective time series chart prior to randomly selecting the pair of respective time series charts and the correlation detection technique.

In some implementations, the correlation detection platform may process additional pairs of respective time series charts until at least one of: a quantity of pairs of respective time series charts that have been processed satisfies a threshold, or respective scores for the additional pairs of respective time series charts fail to improve by a threshold amount for a threshold quantity of iterations. In some implementations, the correlation detection platform may send a message to a client device for display after processing the additional pairs of respective time series charts (e.g., where the message includes information that identifies the score for the pair of respective time series charts and the respective scores for the additional pairs of respective time series charts). In some implementations, the correlation detection platform may receive, from a client device, information that indicates that the pair of respective time series charts is of interest to a user of the client device, and may update a machine learning module based on the information that indicates that the pair of respective time series charts is of interest.

In some implementations, the correlation detection platform may randomly select another pair of respective time series charts and another correlation detection technique based on the score or a value of a counter (e.g., where the value of the counter indicates a quantity of selections that have been made), and may determine another score for the other pair of respective time series charts after randomly selecting the other pair of respective time series charts and the other correlation detection technique. In some implementations, the correlation detection platform may determine a correlation for the pair of respective time series charts based on using the correlation detection technique.

In some implementations, the correlation detection platform may output information that identifies the multiple classifications for display via a client device, may request, via the client device, confirmation of the multiple classifications from a user of the client device in association with outputting the information for display (e.g., where the client device requests confirmation of the multiple classifications from a user of the client device), may detect a modification to the multiple classifications based on a user interaction with the information via the client device, and may update a machine learning module associated with the device based on the modification to the multiple classifications (e.g., where the machine learning module is configured to identify the multiple classifications included in the time series data). In some implementations, the correlation detection platform may utilize an evolutionary algorithm in association with randomly selecting the other pair of respective time series charts and the other correlation detection technique (e.g., where the evolutionary algorithm causes a machine learning module associated with the device to be updated based on the score for the pair of respective time series charts).

In some implementations, the correlation detection platform may determine that the quantity of selections satisfies a selection threshold prior to randomly selecting the other pair of respective time series charts and the other correlation algorithm, or may determine that respective scores for a threshold quantity of previous selections fail to improve by an amount that satisfies a correlation threshold prior to randomly selecting the other pair of respective time series charts and the other correlation detection algorithm. In some implementations, the correlation detection platform may randomly select the other pair of respective time series charts and the other correlation detection technique based on at least one of: determining that the quantity of selections satisfies the selection threshold, or determining that the respective scores for the threshold quantity of previous selections fail to improve by the amount that satisfies the correlation threshold.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is another flow chart of an example process 500 for detecting correlation among sets of time series data. In some implementations, one or more process blocks of FIG. 5 may be performed by a correlation detection platform (e.g., correlation detection platform 230). In some implementations, one or more process blocks of FIG. 4 may be performed by another device or a group of devices separate from or including the correlation detection platform, such as a client device (e.g., client device 210) or a server device (e.g., server device 220).

As shown in FIG. 5, process 500 may include receiving time series data from one or more data sources (block 510). For example, the correlation detection platform (e.g., using computing resource 234, processor 320, input component 350, communication interface 370, and/or the like) may receive time series data from one or more data sources.

In some implementations, the correlation detection platform may receive the time series data in a manner that is the same as or similar to that described with regard to FIGS. 1A-1C. For example, the correlation detection platform may receive the time series data from a data source (e.g., a server device) and using a data validation component.

As further shown in FIG. 5, process 500 may include grouping the time series data based on multiple classifications included in the time series data (block 520). For example, the correlation detection platform (e.g., using computing resource 234, processor 320, and/or the like) may group the time series data based on multiple classifications included in the time series data.

In some implementations, the correlation detection platform may group the time series data in a manner that is the same as or similar to that described with regard to FIGS. 1A-1C. For example, the correlation detection platform may group the time series data using a classification component.

As further shown in FIG. 5, process 500 may include generating a respective time series chart for the multiple classifications (block 530). For example, the correlation detection platform (e.g., using computing resource 234, processor 320, and/or the like) may generate a respective time series chart for the multiple classifications.

In some implementations, the correlation detection platform may generate a respective time series chart in a manner that is the same as or similar to that described with regard to FIGS. 1A-1C. For example, the correlation detection platform may generate a respective time series chart using a chart generation component.

As further shown in FIG. 5, process 500 may include refining the time series data based on an amount of randomness detected in the respective time series chart for the multiple classifications (block 540). For example, the correlation detection platform (e.g., using computing resource 234, processor 320, and/or the like) may refine the time series data based on an amount of randomness detected in the respective time series chart for the multiple classifications.

In some implementations, the correlation detection platform may refine the time series data in a manner that is the same as or similar to that described with regard to FIGS. 1A-1C. For example, the correlation detection platform may refine the time series data using a randomness detection component.

As further shown in FIG. 5, process 500 may include randomly selecting a pair of respective time series charts and a correlation detection technique of a plurality of correlation detection techniques (block 550). For example, the correlation detection platform (e.g., using computing resource 234, processor 320, and/or the like) may randomly select a pair of respective time series charts and a correlation detection technique of a plurality of correlation detection techniques.

In some implementations, the correlation detection platform may randomly select a pair of respective time series charts and a correlation detection technique in a manner that is the same as or similar to that described with regard to FIGS. 1A-1C. For example, the correlation detection platform may randomly select a pair of respective time series charts and a correlation detection technique using a correlation detection component.

As further shown in FIG. 5, process 500 may include determining a score for the pair of respective time series charts based on the correlation of the pair of respective time series charts (block 560). For example, the correlation detection platform (e.g., using computing resource 234, processor 320, and/or the like) may determine a score for the pair of respective time series charts based on the correlation of the pair of respective time series charts.

In some implementations, the correlation detection platform may determine a score for the pair of respective time series charts in a manner that is the same as or similar to that described with regard to FIGS. 1A-1C. For example, the correlation detection platform may determine a score for the pair of respective time series charts using a scoring and ranking component.

As further shown in FIG. 5, process 500 may include performing one or more actions after determining the score for the pair of respective time series charts (block 570). For example, the correlation detection platform (e.g., using computing resource 234, processor 320, and/or the like) may perform one or more actions after determining the score for the pair of respective time series charts.

In some implementations, the correlation detection platform may perform one or more actions in a manner that is the same as or similar to that described with regard to FIGS. 1A-1C. For example, the correlation detection platform may output a result of processing a respective pair of time series charts for display via the client device.

Process 500 may include additional implementations, such as any single implementation or any combination of implementations described below.

In some implementations, the correlation detection platform may group the time series data based on classification identifiers included in the time series data. In some implementations, the correlation detection platform may plot the time series data for the multiple classifications on corresponding virtual charts, and may store the corresponding virtual charts using memory resources of the device. In some implementations, the correlation detection platform may process the time series data using a randomness detection technique (e.g., where the randomness detection technique is associated with detecting the amount of randomness in the time series data), may determine that the amount of randomness in a subset of the time series data satisfies a threshold after processing the time series data using the randomness detection technique, and may remove the subset of the time series data from the time series data after determining that the amount of randomness in the subset of the time series data satisfies the threshold.

In some implementations, the correlation detection platform may randomly select another pair of respective time series charts and another correlation detection technique based on the score or a value of a counter (e.g., where the value of the counter indicates a quantity of selections performed by the device), and may randomly select the other pair of respective time series charts and the other correlation detection technique after randomly selecting the other pair of respective time series charts and the other correlation detection technique. In some implementations, the correlation detection platform may generate a report that includes information that identifies the score for the pair of respective time series charts, and may output the report to a client device for display via a user interface after generating the report. In some implementations, the correlation detection platform may process the pair of respective time series charts using the correlation detection technique to detect the correlation of the pair of respective time series charts after selecting the pair of respective time series charts and the correlation detection technique.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, the correlation detection platform may randomly select pairs of time series charts for processing to determine a correlation of the pairs of time series charts. This improves a correlation analysis by reducing an amount of time that is needed to perform this type of analysis. In addition, this provides a tool that can be used to process millions, billions, or more data elements in a manner not previously possible. Further, this provides a tool that can facilitate more efficient operations of an organization via improved insight into correlation among operations of the organization.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
 receiving, by a device, time series data from one or more data sources;

pre-processing, by the device, the time series data to generate a respective time series chart for multiple classifications included in the time series data;

randomly selecting, by the device, a pair of respective time series charts and a correlation detection technique of a plurality of correlation detection techniques, wherein the correlation detection technique is associated with detecting a correlation of the pair of respective time series charts;

determining, by the device, a score for the pair of respective time series charts based on the correlation of the pair of respective time series charts, wherein the score indicates the correlation of the pair of respective time series charts with each other;

randomly selecting, by the device and based on the score, or a value of a counter, satisfying a threshold, another pair of respective time series charts and another correlation detection technique, wherein the value of the counter indicates a quantity of selections performed by the device; and performing, by the device, one or more actions after randomly selecting the other pair of respective time series charts and the other correlation detection technique.

2. The method of claim 1, wherein pre-processing the time series data comprises:

grouping the time series data according to the multiple classifications included in the time series data after receiving the time series data; and generating the respective time series chart for the multiple classifications after grouping the time series data.

3. The method of claim 1, wherein pre-processing the time series data comprises:

refining the respective time series chart for the multiple classifications based on an amount of randomness identified in the respective time series chart prior to randomly selecting the pair of respective time series charts and the correlation detection technique.

4. The method of claim 1, wherein the correlation detection technique includes at least one of:

a Pearson correlation technique, a seasonal Kendall technique, or a Kendall's tau technique.

5. The method of claim 1, further comprising:

outputting information that identifies the multiple classifications for display via a client device, wherein the client device requests confirmation of the multiple classifications from a user of the client device;

detecting a modification to the multiple classifications based on a user interaction with the information via the client device; and updating a machine learning module associated with the device based on the modification to the multiple classifications, wherein the machine learning module is configured to identify the multiple classifications included in the time series data.

6. The method of claim 1, further comprising:

utilizing an evolutionary algorithm in association with randomly selecting the other pair of respective time series charts and the other correlation detection technique, wherein the evolutionary algorithm causes a machine learning module associated with the device to be updated based on the score for the pair of respective time series charts.

7. The method of claim 1, wherein the threshold is a selection threshold, associated with the quantity of selections, or a correlation threshold associated with the score, and further comprising:

determining that the quantity of selections satisfies the selection threshold prior to randomly selecting the other pair of respective time series charts and the other correlation detection technique, or determining that respective scores for a threshold quantity of previous selections fail to improve by an amount that satisfies the correlation threshold prior to randomly select the other pair of respective time series charts and the other correlation detection technique; and wherein randomly selecting the other pair of respective time series charts and the other correlation detection technique comprises:

randomly selecting the other pair of respective time series charts and the other correlation detection technique based on at least one of:

determining that the quantity of selections satisfies the selection threshold, or determining that the respective scores for the threshold quantity of previous selections fail to improve by the amount that satisfies the correlation threshold.

8. A device, comprising:

one or more memories; and one or more processors, coupled to the one or more memories, to:

receive time series data from one or more data sources;

group the time series data based on multiple classifications included in the time series data;

generate a respective time series chart for the multiple classifications;

remove a subset of the time series data based on an amount of randomness, detected in the respective time series chart for the multiple classifications, satisfying a threshold;

randomly select a pair of respective time series charts and a correlation detection technique of a plurality of correlation detection techniques, wherein the correlation detection technique is associated with detecting a correlation of the pair of respective time series charts;

determine a score for the pair of respective time series charts based on the correlation of the pair of respective time series charts, wherein the score indicates an extent to which the pair of respective time series charts is correlated with each other; and perform one or more actions after determining the score for the pair of respective time series charts.

9. The device of claim 8, wherein the one or more processors, when performing the one or more actions, are to:

randomly select another pair of respective time series charts and another correlation detection technique based on the score or a value of a counter, wherein the value of the counter indicates a quantity of selections performed by the device; and randomly select the other pair of respective time series charts and the other correlation detection technique after randomly selecting the other pair of respective time series charts and the other correlation detection technique.

10. The device of claim 8, wherein the one or more processors are further to:

process the pair of respective time series charts using the correlation detection technique to detect the correlation of the pair of respective time series charts after selecting the pair of respective time series charts and the correlation detection technique.

11. The device of claim 8, wherein the one or more processors, to group the time series data, are to:
group the time series data based on classification identifiers included in the time series data.

12. The device of claim 8, wherein the one or more processors, to generate the respective time series chart for the multiple classifications, are to:
plot the time series data for the multiple classifications on corresponding virtual charts; and
store the corresponding virtual charts using memory resources of the device.

13. The device of claim 8, wherein the one or more processors are further to:
process the time series data using a randomness detection technique,
wherein the randomness detection technique is associated with detecting the amount of randomness in the time series data; and
determine that the amount of randomness in the subset of the time series data satisfies the threshold after processing the time series data using the randomness detection technique.

14. The device of claim 8, wherein the one or more processors, to perform the one or more actions, are to:
generate a report that includes information that identifies the score for the pair of respective time series charts; and
output the report to a client device for display via a user interface after generating the report.

15. A non-transitory computer-readable medium storing instructions, the instructions comprising:
one or more instructions that, when executed by one or more processors, cause the one or more processors to:
receive time series data from one or more data sources;
pre-process the time series data to generate a respective time series chart for multiple classifications included in the time series data;
randomly select a pair of respective time series charts and a correlation detection technique, of a plurality of correlation detection techniques, after pre-processing the time series data;
determine a correlation for the pair of respective time series charts based on using the correlation detection technique;
determine a score for the pair of respective time series charts based on the correlation of the pair of respective time series charts,
wherein the score indicates an extent to which the pair of respective time series charts is correlated with each other; and
process one or more additional pairs of respective time series charts, after determining the score for the pair of respective time series charts, based on at least one of the score or a value of a counter,
wherein the value of the counter indicates a quantity of pairs of respective time series charts that have been processed.

16. The non-transitory computer-readable medium of claim 15, wherein the one or more instructions, that cause the one or more processors to process the one or more additional pairs of respective time series charts, cause the one or more processors to:
process the one or more additional pairs of respective time series charts until at least one of:
the value satisfies a threshold, or
the score improving another score associated with a previously processed pair of respective time series charts by a threshold amount for a threshold quantity of iterations.

17. The non-transitory computer-readable medium of claim 16, wherein the one or more instructions when executed by the one or more processors, further cause the one or more processors to:
send a message to a client device for display after processing the additional pairs of respective time series charts,
wherein the message includes information that identifies the score for the pair of respective time series charts and the other score for the previously processed pair of respective time series charts.

18. The non-transitory computer-readable medium of claim 15, wherein the one or more instructions, that cause the one or more processors to pre-process the time series data, cause the one or more processors to:
group the time series data based on the multiple classifications;
generate the respective time series chart for the multiple classifications after grouping the time series data; and
refine the time series data based on an amount of randomness detected in the respective time series chart for the multiple classifications after generating the respective time series chart.

19. The non-transitory computer-readable medium of claim 15, wherein the one or more instructions, when executed by the one or more processors, cause the one or more processors to:
receive, from a client device, information that indicates that the pair of respective time series charts is of interest to a user of the client device; and
update a machine learning module based on the information that indicates that the pair of respective time series charts is of interest.

20. The non-transitory computer-readable medium of claim 15, wherein the one or more instructions, that cause the one or more processors to process the one or more additional pairs of respective time series charts, cause the one or more processors to:
randomly select another pair of respective time series charts and another correlation detection technique; and
determine another score for the other pair of respective time series charts after randomly selecting the other pair of respective time series charts and the other correlation detection technique.

* * * * *